Nov. 21, 1961  J. H. PLUMMER  3,009,199
METHOD AND APPARATUS FOR PRODUCING GLASS FIBERS
Filed Dec. 30, 1957
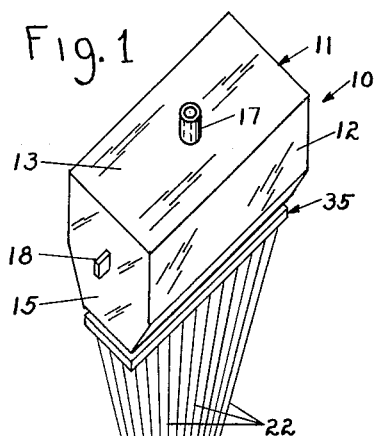
Fig. 1
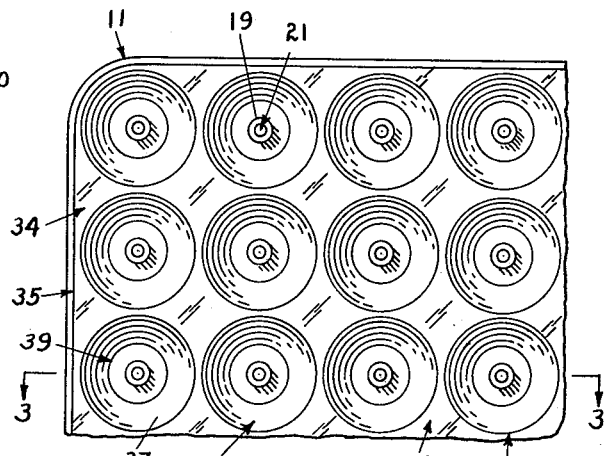
Fig. 2
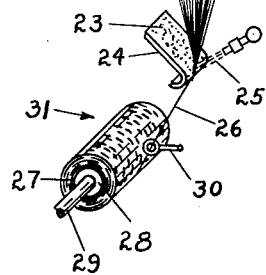
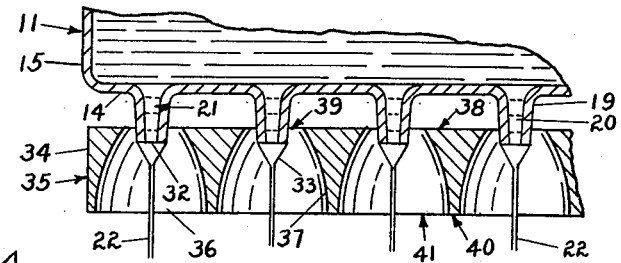
Fig. 3
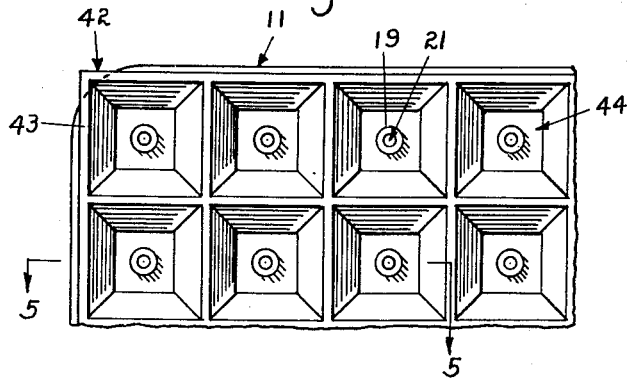
Fig. 4
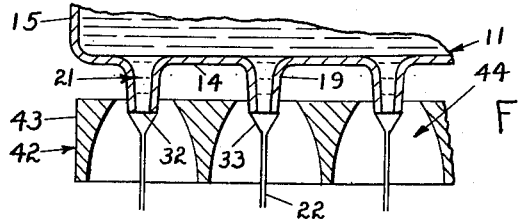
Fig. 5
Fig. 6
INVENTOR.
Jesse H. Plummer
BY Nobbe & Swope
ATTORNEYS United States Patent Office 3,009,199
Patented Nov. 21, 1961

3,009,199
METHOD AND APPARATUS FOR PRODUCING GLASS FIBERS
Jesse H. Plummer, Toledo, Ohio, assignor, by mesne assignments, to Johns-Manville Fiber Glass Inc., Cleveland, Ohio, a corporation of Delaware
Filed Dec. 30, 1957, Ser. No. 705,950
9 Claims. (Cl. 18—8)

This invention relates to a method and apparatus for producing glass fibers. More particularly this invention relates to a method and apparatus for producing continuous glass fibers.

Production of continuous glass fibers comprises establishing a body of molten glass in a melting chamber having a plurality of orifices in a wall thereof. The molten glass exudes through the orifices as small streams which are pulled at high speed to form fibers of very small diameter. The point of pulling or attenuation is located adjacent the wall of the melting chamber by virtue of the short distance which the aforementioned apertures extend beyond such wall. Since the melting chamber is a high level producer of radiant energy, fiber attenuation takes place in a zone which is highly heated. In many instances the radiant energy from the melting chamber has been found to be of such intensity to cause the small fibers to be melted thus interrupting the attenuation process. This has long been a perplexing problem in the production of continuous glass fibers, having caused much machine down time and resultant decreased efficiency of operation.

The purpose of this invention therefore is to provide means for protecting the fiber attenuation zone or "cone area" from the radiant energy emanating from the wall of the melting chamber through which the streams of molten glass are exuded and adjacent which fiber attenuation takes place.

This is accomplished by interposing a protective member, intermediate the melting chamber wall and its protuberances or tips defining the orifices, having both high heat absorptivity and emissivity properties. High heat absorptivity is desirable in the areas facing or "looking" at the orifices to absorb heat from the adjacent region and transfer the heat away from the orificed protuberances. High heat emissivity is desirable in the areas facing or "looking" at the chamber bottom wall to transfer thereto the absorbed heat and to reflect the heat radiated therefrom. Thus the termini of the protuberances are protected by absorbing heat therefrom and also by shielding them from heat radiated from the chamber bottom.

It is therefore an important object of this invention to provide an improved method and apparatus for producing continuous glass fibers.

It is another object to provide improved cone shielding in the production of continuous glass fibers.

A further object is to provide an improved method and apparatus for cone cooling in the production of continuous glass fibers.

A further object is to provide a novel shielded tip for a glass melting chamber for producing continuous fibers.

Other objects and advantages of the invention will become more apparent during the course of the following description when taken in connection with the accompanying drawings.

In the drawings wherein like numerals are employed to designate like parts throughout the same:

FIG. 1 is a perspective view of apparatus adapted for the production of continuous glass fibers;

FIG. 2 is a bottom plan view of one form of shield constructed in accordance with the present invention, and showing the shield in position at the tip area beneath the melting chamber;

FIG. 3 is a section view taken along line 3—3 of FIG. 2;

FIG. 4 is a bottom plan view of a second form of shield constructed in the manner of the present invention, also showing the shield in position at the tip area beneath the melting chamber; and FIG. 5 is a section view taken along line 5—5 of FIG. 4.

FIGURE 6 is a modified form of the shield shown in FIGURE 5.

The protective member of the present invention can be formed either as a perforated plate, a grid structure or if desired of individual multi-sided members. Where a plate is utilized it is positioned in parallel relation to the wall of the melting chamber containing the orifice. A grid structure would also have its body positioned in parallel relation to the wall of the melting chamber. Where individual units are utilized, their axes are positioned coaxially of the fibers and at the point where the fibers are drawn from the cones.

As shown in FIG. 1 there is an apparatus 10 for producing continuous glass fibers in which the method and apparatus of the present invention may be used. The apparatus includes a melting chamber 11 made of metal designed to retain molten glass for sustained periods at glass melting temperatures. The melting chamber includes a side wall 12 having a portion of vertical configuration which is joined to a top element 13 of horizontal disposition. The lower part of the side wall 12 slopes inwardly and downwardly and is joined to a bottom wall 14 which is of the horizontal disposition like the top. Ends 15 are fitted in joined relation to the top, sides and bottom to form an enclosed chamber adapted to retain glass in molten form.

An inlet opening 17 is provided in the top 13 for the introduction of increments of solid glass into the interior of the melting chamber. Each of the ends 15 is provided with a lug 18 for connection to a source of electric current (not shown). Thereby the melting chamber can be heated by resistance and thus the glass increments placed therein rendered molten.

The bottom wall 14 is provided with a plurality of tips 19, FIGS. 2 and 3, through which molten glass from the interior of the melting chamber is exuded as small streams 20. The tips are formed integrally with the bottom 14 of the melting chamber and are of generally tubular shape, provided with small bores 21 through which the glass exudes as streams. The streams are attenuated and drawn out into fine fibers 22 which are gathered together at a felt pad 23 stretched over a shaped metal holder 24. A liquid size material 25 is applied to the pad 23 and contains an adhesive to bind the fibers 22 into a coherent strand 26, and in addition a lubricant for reducing abrasion between the fibers.

The strand 26 is directed downwardly and is wound upon a tube 27 supported by a mandrel 28 which is mounted for rotation upon a shaft 29. The strand is directed back and forth across the face of the tube by a traverser 30 to form a package or cake 31.

As mentioned above the tips 19 through which the molten glass is exuded for fiber formation are of tubular configuration and are formed integrally with the bottom 14 of the melting chamber. The tips extend beyond the outer surface of the bottom of the melting chamber and terminate a short distance therefrom. The distance of the termini 32 of the tips from the bottom in general falls in a range from ¼ to ½" and the cones of glass 33 from which the fibers 22 are attenuated are formed at such tips. It will thus be seen that inasmuch as the bottom 14 of the melting chamber is a high intensity producer of radiant energy and that the fibers 22 are, without some protective device, subjected to sufficient heat to be remelted, even though being drawn away from the cones 33 at a rate of 8,000 to 20,000 lineal feet per minute and even though such drawing rate provides a high cooling rate.

In accordance with the present invention a protective member 34 of high heat absorptivity and high heat emissivity is positioned to surround each of the cones 33 and direct heat energy away from the cones to the atmosphere and thereby reduce the amount of heat reaching the fibers.

In the embodiment of FIGS. 2 and 3 the protective or heat absorbing and radating member comprises a plate 35 provided with a plurality of apertures 36 corresponding in number to the tips 19 formed in the bottom 14 of the melting chamber 11. The apertures 36 are formed with their walls 37 of parabolic configuration with the focal points thereof positioned in proximity to the cones of glass 33 formed at the tip extremities 32. The small end of the parabolic curve terminates at the upper surface 38 of the plate as a small circular opening 39, slightly larger than the outside diameter of the tip whereby the tip extremity may be passed therethrough without contact. The other end of the parabolic curve terminates at the lower surface 40 of the protective member in a larger opening 41. The protective member 34 is positioned with the upper surface 38 slightly above the tip extremity 32 thereby being interposed between the cone of glass 33 and the high energy radiating surface of the bottom 14 of the melting chamber 11.

A second embodiment of the shield of invention is shown by the views of FIGS. 4 and 5. In such embodiment the protective member 42 is also fabricated as a flat plate 43 with a plurality of openings 44 therein corresponding in number and location to the tips 19 of the melting chamber 11. However, instead of being round the apertures are square, that is of square horizontal section and of frusto-pyramidal configuration. In this embodiment also the walls of the apertures are fabricated of parabolic curvature so that reflection is downwardly, parallel to the axes of the fibers.

It is to be considered within the scope of the invention to position a reflective plate or coating 45 upon the upper surface of the present protective member FIG. 6. Such reflective plate, or coating, may be fabricated of platinum or alloys thereof such as the platinum-rhodium alloys. Gold, silver and the like including stainless steel may also be utilized and preferably those materials which are resistant to tarnishing will be employed. It is also within the scope of the invention to include reflective shields made of pressed and bonded mineral fibers such as quartz or asbestos, with the upper surface thereof plated with a reflective metal enumerated above.

By this combination, heat radiated from the bottom of the melting chamber is reflected back into the melt, wihch is advantageous for stabilizing the temperature of the melt at one of the more highly critical areas, namely the bottom thereof. By so operating, the temperature of the protective member may be lowered and consequently the absorptivity of the parabolic surfaces for heat from the cones of glass will be greater due to increased temperature differential between the protective member and cones.

It is also to be considered within the scope of the invention to coat the parabolic surfaces of the protective member as at 46 in FIG. 6 of invention to improve the reflectivity, alluded to hereinbefore, of heat from the cones of glass along the axes of the fibers.

In some instances for further flexibility of control of the temperature of the shield of the invention, it may be desirable to coat only the upper surface of the protective member or the parabolic surfaces at one time.

The function of the protective member of invention is as follows. Since it is positioned between the bottom of the melting chamber and the cone of glass formed on the extremity of a tip, heat from the melting chamber is absorbed by the structure and thereby prevented from striking the cone. Further, because the protective member is positioned in spaced relation with respect to the bottom of the chamber, the protective member operates at a temperature less than the temperature of the melting chamber. Thus the cones will radiate to the protective member, to provide improved cone cooling.

By the fact of its high absorbtivity, the protective member is necessarily a high energy emitter. It will therefore, after reaching equilibrium, reradiate heat from its upper and lower surfaces but at temperatures less than the temperature of the melting chamber for the reasons set forth above. The protective member will also reflect from the parabolic surfaces which are positioned in surrounding relation to the cones. The parabolic surfaces are adapted to reflect downwardly parallel to the draw of the fibers. The parabolic surfaces also absorb heat from the cones and fibers, which heat is transmitted for reradiation from the top and bottom surfaces of the shield to thereby augment cooling of the fibers and cones. The result provided is improved fiber forming efficiency, because of reduced fiber breaks by remelting.

Materials of which the present protective member may be fabricated include those of high heat absorptivity and high heat emissivity. Such materials include copper, brass, stellite, cast iron, Monel metal and steel. These materials in solution will become oxidized and approach blackness. In general, the absorptive level of the material from which the shield of invention is fabricated should be 0.20 or above, that is, at least 20% of the radiant energy falling upon the body must be absorbed or transformed into heat. Correspondingly the total emissivity of the material should be at least 0.15.

While the present invention has been illustrated as applied to a glass melting chamber of rectangular configuration and fabricated of metal it is to be considered within the scope of invention to utilize the protective member with a melting chamber of circular configuration fabricated either of metal or refractory clay.

It will thus be seen that the present invention provides a glass melting chamber wherein the fiber forming area is shielded from direct radiant energy from the melting chamber, said heat being absorbed and reradiated to the atmosphere in sufficiently diminished intensity to the glass to reduce fiber remelting.

A number of advantages accrue from the present invention. The cone cooling rate is greatly increased and rendered more uniform. Also the tips are prevented from radiating to each other. Further, any temperature differential between tips is leveled out by use of the present invention. Glass output through different tips is thereby rendered more uniform.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. A glass melting chamber having a wall adapted to contain molten glass, said wall having a protruding portion defining an orifice through which glass is exuded, said protruding portion having a delivery extremity spaced from said wall, and a body of high emissivity and high absorptivity compared to and positioned in surrounding relation with said delivery extremities and spaced from said wall in non-conducting heat transfer relation.

2. A glass melting chamber as defined in claim 1, wherein the heat absorbing and emitting member is fabricated of copper.

3. A glass melting chamber as defined in claim 1, wherein the heat absorbing and emitting member is fabricated of an alloy of iron.

4. A glass melting chamber as defined in claim 1, wherein the heat absorbing and emitting member has a surface of parabolic curvature with the focal point of the parabola defined by such surface being coincident to the extremity and to the axis of said orifice with the axis of said parabola positioned coaxially to the axis of said fiber.

5. A glass melting chamber having a wall adapted to contain molten glass, said wall having a protruding portion defining an orifice in said wall through which molten glass is exuded, said protruding portion having a delivery extremity spaced from said wall, a copper plate, said plate having an aperture therein, said aperture being formed as a parabola and positioned coextensively of said orifice, said parabola and said orifice being coaxial.

6. A glass melting chamber as defined in claim 5, wherein the surface of the parabola is coated with a reflective metal.

7. A glass melting chamber as defined in claim 5, wherein the upper surface of said copper plate is coated with a reflective metal.

8. In the method of producing glass fibers by withdrawing a stream from a body of molten glass and attenuating said stream into a fiber at a point spaced from said body, the improvement comprising: reducing the heat content of the fiber at the point of attenuation by absorbing heat radiated therefrom and primarily transferring the absorbed heat in air paths parallel to the axis of travel of said fiber.

9. A glass melting chamber having a wall defining an opening through which glass is exuded to form a cone, and a body of high emissivity and high absorptivity compared to and in non-conducting heat transfer relation with said wall, said body also having an aperture in co-axial and surrounding relation with said cone.

References Cited in the file of this patent

UNITED STATES PATENTS

| | | |
|---|---|---|
| 2,439,083 | French | Apr. 6, 1948 |
| 2,634,553 | Russell | Apr. 14, 1953 |

FOREIGN PATENTS

| | | |
|---|---|---|
| 205,674 | Australia | Jan. 18, 1957 |
| 1,050,646 | France | Sept. 2, 1953 |
| 452,810 | Great Britain | Aug. 31, 1936 |
| 605,001 | Great Britain | July 14, 1948 |